US012340324B2

(12) United States Patent
Shao et al.

(10) Patent No.: US 12,340,324 B2
(45) Date of Patent: Jun. 24, 2025

(54) METHOD FOR DETERMINING SMART GAS WORK ORDER SET ALLOCATION PLAN AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Guanghua Huang, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/751,257

(22) Filed: Jun. 23, 2024

(65) Prior Publication Data

US 2024/0346402 A1    Oct. 17, 2024

Related U.S. Application Data

(63) Continuation of application No. 18/340,854, filed on Jun. 24, 2023, now Pat. No. 12,056,636.

(30) Foreign Application Priority Data

Apr. 27, 2023   (CN) .................. 202310470863.4

(51) Int. Cl.
  *G06Q 10/0631*   (2023.01)
  *G06Q 10/20*    (2023.01)
  *G06Q 50/06*    (2024.01)

(52) U.S. Cl.
  CPC . *G06Q 10/06311* (2013.01); *G06Q 10/06315* (2013.01); *G06Q 10/20* (2013.01); *G06Q 50/06* (2013.01)

(58) Field of Classification Search
  CPC .. G06Q 10/06311; G06Q 10/20; G06Q 50/06; G06Q 10/06; G06Q 10/063114; Y04S 10/50; G05B 23/0294; G01D 4/002
  See application file for complete search history.

(56) References Cited

U.S. PATENT DOCUMENTS

2010/0312605 A1*  12/2010  Mitchell .......... G06Q 10/06311
                                                                705/7.13
2013/0211797 A1*   8/2013  Scolnicov .......... G06Q 50/06
                                                                703/2

(Continued)

FOREIGN PATENT DOCUMENTS

CN      103870317 A    6/2014
CN      109974740 A    7/2019

(Continued)

OTHER PUBLICATIONS

W. Wang, et al. "Data-Driven Intelligent Maintenance Planning of Smart Meter Reparations for Large-Scale Smart Electric Power Grid" 2018 IEEE Smart World (SmartWorld/SCALCOM/UIC/ATC/CBDCom/IOP/SCI), Guangzhou, China, 2018, pp. 1929-1935, <https://ieeexplore.ieee.org/document/8560301?source=IQplus> (Year: 2018).*

(Continued)

*Primary Examiner* — Jerry O'Connor
*Assistant Examiner* — Michael R Koester
(74) *Attorney, Agent, or Firm* — METIS IP LLC

(57)   ABSTRACT

The embodiments of the present disclosure provide a method and an Internet of Things system for determining a smart gas work order set allocation plan. The method includes: obtaining relevant data of the gas device, and uploading the relevant data to a smart gas management platform; extracting work order features of a work order to be assigned based on the relevant data of the gas device; determining a plurality of cluster sets based on a cluster distance between the work order features; determining at (Continued)

least one linked work order set based on the plurality of cluster sets; extracting set features of the linked work order set; determining an assignment scheme of the linked work order set based on the set features; determining an optimal scheme, determining a linkage processing scheme based on the optimal scheme; sending the assignment scheme and the linkage processing scheme to a smart gas service platform.

14 Claims, 5 Drawing Sheets

(56) References Cited

U.S. PATENT DOCUMENTS

| | | | | |
|---|---|---|---|---|
| 2020/0210965 | A1* | 7/2020 | Garber | G06Q 10/04 |
| 2020/0293997 | A1* | 9/2020 | Shao | G08B 21/18 |
| 2023/0027594 | A1 | 1/2023 | Esmalifalak et al. | |
| 2023/0103433 | A1* | 4/2023 | Umakanth | G06Q 10/063118 |
| | | | | 705/7.15 |

FOREIGN PATENT DOCUMENTS

| | | | |
|---|---|---|---|
| CN | 110020777 | A | 7/2019 |
| CN | 110555452 | A | 12/2019 |
| CN | 111949795 | A | 11/2020 |
| CN | 113220545 | A | 8/2021 |
| CN | 114510566 | A | 5/2022 |
| CN | 114612262 | A | 6/2022 |
| CN | 115456219 | A | 12/2022 |
| CN | 115879913 | A | 3/2023 |
| WO | WO-2020153903 | A1 * | 7/2020 ............ G01D 4/002 |

OTHER PUBLICATIONS

Deng, Zhidong et al., Dynamic Distribution Method of Emergency Work Order Information in Power Customer Service Center, Microcomputer Applications, 38(5): 192-195, 2022.

Chen, Jiaxue et al., Research on power grid emergency repair management and control technology based on data fusion and intelligent analysis algorithm, Electronic Design Engineering, 30(2): 142-146, 2022.

Huang, Shengzhu et al., Design and Implementation of Distribution Network Production Emergency Repair Command Platform of Power Supply Company, China Excellent Master's Dissertation Full-text Database Engineering Technology II Series, 2021, 78 pages.

Masarrat Mirza et al., Optimizing Task Assignment in Hadoop Using an Efficient Job Size-Based Scheduler, International Conference on Intelligent Computing and Control Systems (ICICCS), 1287-1292, 2017.

H. S. Jennath et al., An Efficient Cluster Assignment Algorithm for Scaling Support Vector Clustering, International Conference on Innovative Computing and Communications, 285-297, 2021.

Wang, Weifeng et al., Data-driven Intelligent Maintenance Planning of Smart Meter Reparations for Large-scale Smart Electric Power Grid, IEEE: 1929-1935, 2018.

* cited by examiner

METHOD FOR DETERMINING SMART GAS WORK ORDER SET ALLOCATION PLAN AND INTERNET OF THINGS SYSTEM THEREOF

CROSS-REFERENCE TO RELATED APPLICATIONS

This application is a continuation of U.S. application Ser. No. 18/340,854, filed on Jun. 24, 2023, which claims priority of Chinese Patent Application No. 202310470863.4, filed on Apr. 27, 2023, the entire contents of which are incorporated herein by reference.

TECHNICAL FIELD

The present disclosure relates to the field of gas management system, and in particular, to a method for determining a smart gas work order set allocation plan and an Internet of Things system.

BACKGROUND

In the process of smart gas operation, there will be various feedbacks from users for gas failures. Based on such feedbacks, a large number of gas repair work orders will be generated. The proper assignment and timely processing of these repair work orders is a critical part of the smart gas operation. Therefore, avoiding the imbalance between the supply of processing personnel and the requirement of matter capacity, and making reasonable planning for the route of work order processing are important prerequisites for completing work order in a timely manner and solving user feedback problems. Current work order assignment scheme is often assigned directly to processing personnel based on category and difficulty. or by eligible processing personnel to grab work order. Fragmented work order assignment may lead to inconveniences such as insufficient materials to be carried and scattered traffic routes, thus affecting the efficiency of work order processing.

Therefore, it is desirable to provide a method for determining a smart gas work order set allocation plan and an Internet of Things system to assign work order more reasonably and improve the efficiency of work order processing.

SUMMARY

One or more embodiments of the present disclosure provide a method for determining a smart gas work order set allocation plan. The method is executed by an Internet of Things system for determining a smart gas work order set allocation plan. The IoT system includes a smart gas user platform, a smart gas service platform, a smart gas management platform, a smart gas sensor network platform, and a smart gas object platform. The smart gas sensor network platform is configured as a communication network and a gateway, and the smart gas object platform is configured as a gas device. The method comprises: obtaining relevant data of the gas device by the smart gas object platform, and uploading the relevant data to the smart gas management platform through the smart gas sensor network platform; by the smart gas management platform, extracting work order features of a work order to be assigned based on the relevant data of the gas device; determining a plurality of cluster sets based on a cluster distance between the work order features, the cluster distance being determined based on a fusion of a first distance and a second distance; wherein the first distance is determined based on a distance between a work order similarity feature vector of the work order to be assigned and a work order similarity feature vector of a cluster center point; the second distance is determined based on a distance between a work order dispersion feature vector of the work order to be assigned and a work order dispersion feature vector of the cluster center point; elements in the work order dispersion feature vector include a gas supply impact, the gas supply impact is determined based on the work order features and a regional pipeline network structure map by an impact analysis model, and the impact analysis model is a machine learning model; determining at least one linked work order set based on the plurality of cluster sets, wherein for each cluster set in the plurality of cluster sets, a sum of material requirement of work orders to be assigned in the each cluster set does not exceed a total amount of materials capable of being carried; extracting set features of the linked work order set; determining an assignment scheme of the linked work order set based on the set features, the assignment scheme including at least one of a processing personnel and a pending work order corresponding to the processing personnel; in response to a preset set in the linked work order set meeting a preset condition, determining a scheme which starts processing from an i-th location to be processed and returns to a dispatching site as an optimal scheme, wherein the i-th location to be processed is a location corresponding to an i-th pending work order, and the preset set is a set of next locations to be processed capable of being traveled to starting from the i-th location to be processed in the linked work order set; and in response to the preset set not meeting the preset condition, determining at least one candidate scheme which starts processing from the i-th location to be processed, traverses remaining locations to be processed, and returns to the dispatching site; determining a planning cost corresponding to each candidate scheme in the at least one candidate scheme based on at least one of a traffic time of traversing routes, a work order urgency level, or a work order completion time corresponding to the each candidate scheme; and determining the optimal scheme based on the planning cost; determining a linkage processing scheme based on the optimal scheme; and sending the assignment scheme and the linkage processing scheme to the smart gas service platform; and sending, by the smart gas service platform, the assignment scheme and the linkage processing scheme to a smart gas user according to an inquiry instruction sent by the smart gas user platform.

One or more embodiments of the present disclosure provide an Internet of Things system for determining a smart gas work order set allocation plan, wherein the Internet of Things system includes a smart gas user platform, a smart gas service platform, a smart gas management platform, a smart gas sensor network platform, and a smart gas object platform. The smart gas sensor network platform is configured as a communication network and a gateway, and the smart gas object platform is configured as a gas device. The smart gas object platform is configured to obtain relevant data of the gas device, and upload the relevant data to the smart gas management platform through the smart gas sensor network platform. The smart gas management platform is configured to: extract work order features of a work order to be assigned based on the relevant data of the gas device; determine a plurality of cluster sets based on a cluster distance between the work order features, the cluster distance being determined based on a fusion of a first distance and a second distance; wherein the first distance is determined based on a distance between a work order similarity feature vector of the work order to be assigned and a work order similarity feature vector of a cluster center point; the second distance is determined based on a distance between a work order dispersion feature vector of the work order to be assigned and a work order dispersion feature vector of the cluster center point; elements in the work order dispersion feature vector include a gas supply impact, the gas supply impact is determined based on the work order features and a regional pipeline network structure map by an impact analysis model, and the impact analysis model is a machine learning model; determine at least one linked work order set based on the plurality of cluster sets, wherein for each cluster set in the plurality of cluster sets, a sum of material requirement of work orders to be assigned in the each cluster set does not exceed a total amount of materials capable of being carried; extract set features of the linked work order set; determine an assignment scheme of the linked work order set based on the set features, the assignment scheme including at least one of a processing personnel and a pending work order corresponding to the processing personnel; in response to a preset set in the linked work order set meeting a preset condition, determine a scheme which starts processing from an i-th location to be processed and returns to a dispatching site as an optimal scheme, wherein the i-th location to be processed is a location corresponding to an i-th pending work order, and the preset set is a set of next locations to be processed capable of being traveled to starting from the i-th location to be processed in the linked work order set; and in response to the preset set not meeting the preset condition, determine at least one candidate scheme which starts processing from the i-th location to be processed, traverses remaining locations to be processed, and returns to the dispatching site; determine a planning cost corresponding to each candidate scheme in the at least one candidate scheme based on at least one of a traffic time of traversing routes, a work order urgency level, or a work order completion time corresponding to the each candidate scheme; and determine the optimal scheme based on the planning cost; determine a linkage processing scheme based on the optimal scheme; and send the assignment scheme and the linkage processing scheme to the smart gas service platform. The smart gas service platform is configured to send the assignment scheme and the linkage processing scheme to a smart gas user according to an inquiry instruction sent by the smart gas user platform.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
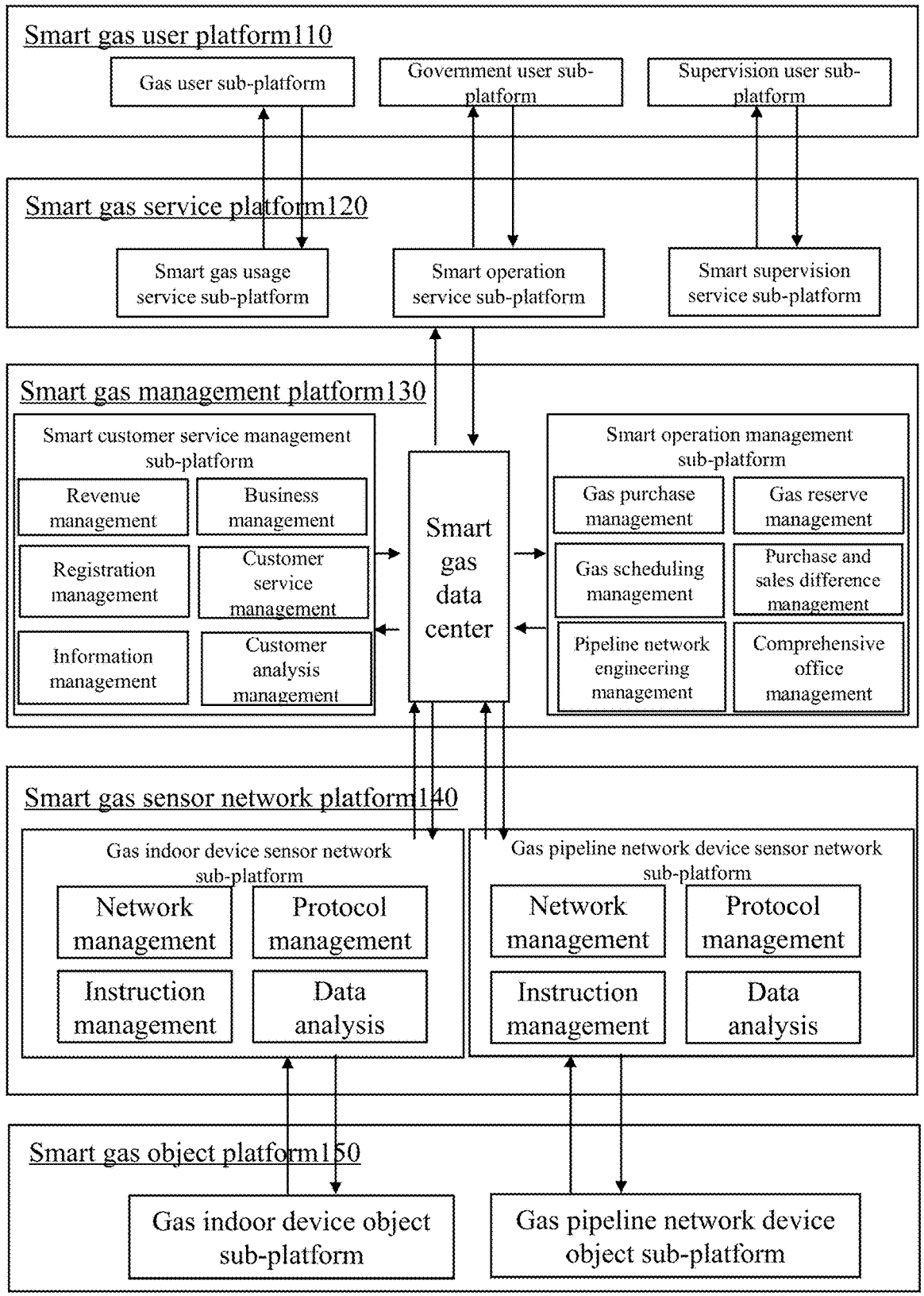
FIG. 1 is a schematic diagram illustrating an exemplary platform structure of an Internet of Things system for platform work order linkage processing based on a smart gas operation according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts. As shown in the present disclosure and the claims, unless the context clearly indicates otherwise, the words "a", "an", and/or "the" do not specifically refer to the singular, but may also include the plural.

FIG. 1 a schematic diagram illustrating an exemplary platform structure of an Internet of Things system for platform work order linkage processing based on a smart gas operation according to some embodiments of the present disclosure. As shown in FIG. 1, an Internet of Things system 100 may include a smart gas user platform, a smart gas service platform, a smart gas management platform, a smart gas sensor network platform, and a smart gas object platform.

In some embodiments, the Internet of Things system 100 may be applied to various application scenarios such as work order linkage processing. In some embodiments, the Internet of Things system 100 may determine at least one linked work order set based on work order features of work orders to be assigned, and plan a linkage processing scheme based on a set feature of the linked work order set.

Various application scenarios of work order linkage processing may include work order management in a newly developed community, a certain area of a city, etc. It should be noted that the above scenarios are only examples and do not limit specific application scenarios of the Internet of Things system 100. Those skilled in the art may apply the Internet of Things system 100 to any other suitable scenarios based on what is disclosed in the embodiments.

The following will specifically describe the Internet of Things system 100.

A smart gas user platform 110 may be a user-oriented service interface which is configured as a terminal device. In some embodiments, the smart gas user platform 110 may include a gas user sub-platform, a government user sub-platform, and a supervision user sub-platform.

The gas user sub-platform may be a sub-platform targeted at gas users. The gas user refers to a consumer of gas. For example, the gas user may be a user who uses gas. In some embodiments, the gas user sub-platform may correspond to and interact with a smart gas usage service sub-platform. For example, the gas user sub-platform may obtain service of safe gas usage from the smart gas usage service sub-platform.

The government user sub-platform may be a sub-platform targeted at government users and provides data related to gas operation for the government users. In some embodiments, the government user sub-platform may correspond to and interact with a smart operation service sub-platform. For example, the government user sub-platform may obtain service of gas operation from the smart operation service sub-platform.

The supervision user sub-platform may be a sub-platform targeted at supervision users and supervise operation of the entire Internet of Things system. The supervision user refers to a user of a security department. In some embodiments, the supervision user sub-platform may correspond to and interact with a smart supervision service sub-platform. For example, the supervision user sub-platform may obtain service of safe supervision requirement from the smart supervision service sub-platform.

In some embodiments, the smart gas user platform 110 may receive information from users. For example, the smart gas user platform 110 may receive feedback from gas users. In some embodiments, the smart gas user platform 110 may feed information back to users. For example, the smart gas user platform 110 may feed information on gas operation management back to users of a gas operator.

In some embodiments, the smart gas user platform 110 may interact with a smart gas service platform 120. For example, the gas user sub-platform may send the feedback (call) of a gas user to the smart gas usage service sub-platform. Gas users may include industrial gas users, commercial gas users, general gas users, or the like. As another example, the government user sub-platform may send inquiry instructions for information on gas operation management to the smart operation service sub-platform. In some embodiments, the information on gas operation management may include a gas work order linkage processing scheme. For example, the government user sub-platform may receive the gas work order linkage processing scheme uploaded by the smart operation service sub-platform.

The smart gas service platform 120 may be a platform for receiving and transmitting data and/or information. In some embodiments, the smart gas service platform 120 may include the smart gas usage service sub-platform, the smart operation service sub-platform, and the smart supervision service sub-platform.

In some embodiments, the smart gas usage service sub-platform may correspond to the gas user sub-platform and provide gas users with information related to a gas device. The smart operation service sub-platform may correspond to the government user sub-platform and provide government users with information related to gas operation. The smart supervision service sub-platform may correspond to the supervision user sub-platform and provide supervision users with information related to supervision management.

In some embodiments, the smart gas service platform 120 may interact with the smart gas user platform 110. For example, the smart gas service platform 120 may receive the inquiry instructions for information on gas operation management sent by the government user sub-platform. As another example, the smart gas service platform 120 may upload the information on gas operation management to the government user sub-platform.

A smart gas management platform 130 refers to an Internet of Things platform that coordinates connection and collaboration between various functional platforms and provides perception management and control management. In some embodiments, the smart gas management platform 130 may include a smart customer service management sub-platform, a smart operation management sub-platform, and a smart gas data center. In some embodiments, the smart customer service management sub-platform and smart operation management sub-platform are independent of each other and are data usage platforms that do not store data. In some embodiments, the smart gas data center aggregates and stores all operation data of the Internet of Things system. In some embodiments, the smart customer service management sub-platform and the smart operation management sub-platform respectively perform two-way interaction with the smart gas data center. For example, the smart customer service management sub-platform and the smart operation management sub-platform obtain relevant data from the smart gas data center, respectively. As another example, the smart customer service management sub-platform and the smart operation management sub-platform send operation data of management to the smart gas data center, respectively.

In some embodiments, the function of the smart customer service management sub-platform may include revenue management, industrial and commercial household management, package management, customer service management, message management, and customer analysis management.

In some embodiments, the function of the smart operation management sub-platform may include gas purchase management, gas reserve management, gas scheduling management, purchase and sale difference management, pipeline network engineering management, and comprehensive office management.

In some embodiments, the smart gas management platform 130 may interact with the smart gas service platform 120 and a smart gas sensor network platform 140, respectively. The interaction between the smart gas management platform 130 and other platforms is realized through the smart gas data center. For example, the smart gas data center may receive inquiry instructions for information on gas operation management sent by the smart operation service sub-platform; and receive feedback information from the gas users sent by the smart gas usage service sub-platform. As another example, the smart gas data center may send instructions for obtaining data related to the gas device to the smart gas sensor network platform 140. As another example, the smart gas data center may receive data related to the gas device uploaded by the smart gas sensor network platform 140. The data related to the gas device may include data such as related operation information of gas pipeline networks in different regions.

In some embodiments, the smart gas data center sends the received data related to the gas device to the smart operation management sub-platform for processing and analysis. The smart operation management sub-platform sends analyzed and processed data to the smart gas data center. The smart gas data center sends aggregated and processed data to the smart gas service platform. The data being sent may include information on operation management (e.g., a work order linkage processing scheme), or the like.

The smart gas sensor network platform 140 may be a platform for realizing interaction between the smart gas management platform 130 and a smart gas object platform 150 and is configured as a communication network and gateway. In some embodiments, the smart gas sensor network platform 140 may include a gas indoor device sensor network sub-platform and a gas pipeline network device sensor network sub-platform.

In some embodiments, the gas indoor device sensor network sub-platform may correspond to a gas indoor device object sub-platform. The gas indoor device sensor network sub-platform may receive data related to a gas indoor device uploaded by the gas indoor device object sub-platform.

In some embodiments, the gas pipeline network device sensor network sub-platform may correspond to a gas pipeline network device object sub-platform. The gas pipeline network device sensor network sub-platform may receive data related to a gas pipeline network device uploaded by the gas pipeline network device object sub-platform.

In some embodiments, the smart gas sensor network platform 140 may interact with a smart gas object platform 150. For example, the smart gas sensor network platform 140 may receive data related to the gas indoor device and/or data related to the pipeline network device uploaded by the smart gas object platform 150. As another example, the smart gas sensor network platform 140 may send instructions for obtaining data related to the gas indoor device and/or instructions for obtaining data related to the pipeline network device to the smart gas object platform 150.

The smart gas object platform 150 may be a functional platform for generating perception information and finally executing control information and is configured as various gas devices. The gas devices may include an indoor device and a pipeline network device. For example, the indoor device may be a metering device (e.g., a gas meter) of gas users. As another example, the pipeline network device may be a certain gate station, various sections of gas pipelines, a gas valve control device, etc. In some embodiments, the smart gas object platform may include the gas indoor device object sub-platform and the gas pipeline network device object sub-platform.

In some embodiments, the gas indoor device object sub-platform may correspond to the gas indoor device sensor network sub-platform. The gas indoor device object sub-platform may upload the data related to the gas indoor device to the smart gas data center through the gas indoor device sensor network sub-platform.

In some embodiments, the gas pipeline network device object sub-platform may correspond to the gas pipeline network device object sub-platform. The gas pipeline network device object sub-platform may upload the data related to the gas pipeline network device to the smart gas data center through the gas pipeline network device object sub-platform.

In some embodiments of the present disclosure, the platform work order linkage processing is implemented through a five-platforms Internet of Things system functional architecture, which completes a closed loop of the information flow and makes information processing of the Internet of Things system more smooth and more efficient.

For those skilled in the art, after understanding the principle of the Internet of Things system, they may apply the Internet of Things system 100 for platform work order linkage processing based on a smart gas operation to any other suitable scenarios without departing from the principle.

It should be noted that the above descriptions of the Internet of Things system and its parts are intended to be convenient, and the present disclosure cannot be limited to the scope of the embodiments. It should be understood that for those skilled in the art, after understanding the principle of the Internet of Things system, they may arbitrarily combine the various parts, or form a sub-system to connect with other parts without departing from the principle. For example, each part may share a common storage device, or each part may also have its own storage device. Such deformations are all within the protection scope of the present disclosure.

Figure 2:
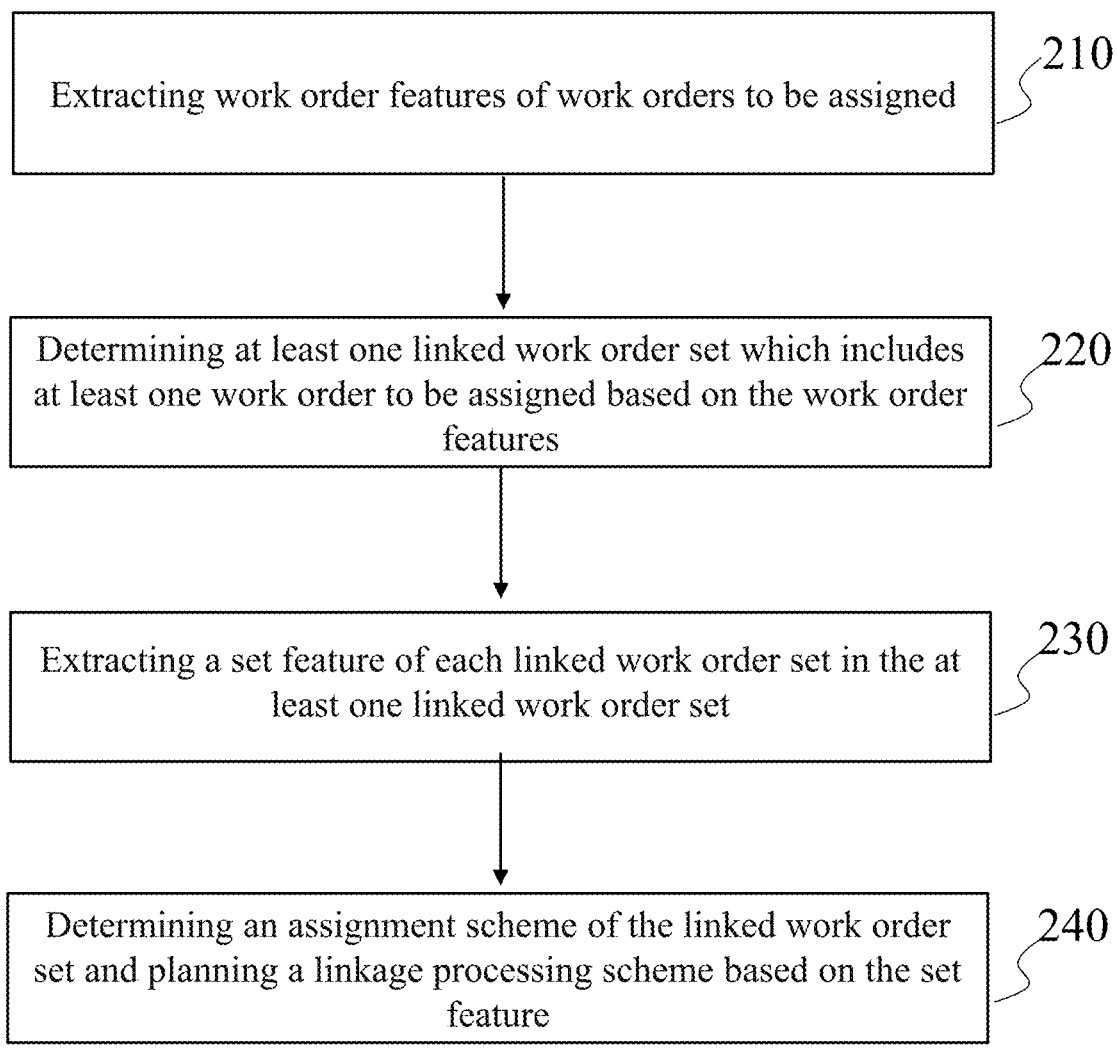
FIG. 2 is a flowchart illustrating an exemplary process for platform work order linkage processing based on a smart gas operation according to some embodiments of the present disclosure.

FIG. 2 is a flowchart illustrating an exemplary process for platform work order linkage processing based on a smart gas operation according to some embodiments of the present disclosure. In some embodiments, a process 200 may be executed by the smart gas management platform. As shown in FIG. 2, the process 200 may include following steps.

Step 210, extracting work order features of work orders to be assigned.

The work order to be assigned refers to a work order to be assigned to processing personnel. The work order may be a worksheet indicating problems with a gas device that needs to be repaired.

The work order may include user information, a repair location, a type of a repair device, and a current status of the repair device. The current status of the repair device may be represented by current data of the repair device, for example, the temperature of a water heater, or as other examples, a failure signal of a water heater, a failure signal of a gas stove, or the like.

In some embodiments, the smart gas management platform may obtain at least one work order to be assigned through user calls. For example, when a user calls the call center, the call center may obtain a work order to be assigned of the user. The at least one work order to be assigned may be obtained based on the smart gas user platform. For example, the at least one work order to be assigned may be obtained through the gas user sub-platform of the smart gas user platform.

The work order features refer to attribute data of the work order. For example, the work order features may include at least one of a gas failure type, a gas failure repairing difficulty, a gas failure location, a gas failure repairing material requirement, a work order urgency level, or a required work order completion time.

The work order features may also include others, which may be determined based on an actual situation. In some embodiments, the work order features may be extracted from work order information based on preset rules.

The gas failure type refers to a relevant classification of gas device failures. For example, the gas failure type may include low gas meters battery, pipeline leaks, or the like. The gas failure type may also include others, which may be determined based on an actual situation. In some embodiments, a relationship between the work order and a repairing type may be preset, and the gas failure type may be obtained according to the preset relationship.

The gas failure repairing difficulty refers to a relevant difficulty classification in repairing gas devices. For example, the gas failure repairing difficulty may be represented by numbers, such as levels 1-9, where level 1 indicates easy and level 9 indicates difficult. In some embodiments, a relationship between the work order and the gas failure repairing difficulty may be preset, and the gas failure repairing difficulty may be obtained according to the preset relationship.

The gas failure location refers to a location where a failed gas device is located. In some embodiments, the gas failure location may be uploaded by the user and included in the work order. In some embodiments, the gas failure location may be obtained based on a gas monitoring device.

The gas failure repairing material requirement refers to a material requirement for repairing a failed gas device. For example, the material requirement may be filters, pipelines, fans, etc., that need to be replaced in the gas device, and an amount of the above materials.

In some embodiments, the material requirement of the work order may be determined through a plurality of ways. For example, a comparison table of the material requirement may be set in advance, and according to different material requirement corresponding to different work orders, a current material requirement corresponding to a current work order may be determined by checking the table. The comparison table of the material requirement may include different work orders and different material requirement corresponding to the different work orders (required materials and an amount of different materials), and the comparison table of the material requirement may be summarized and obtained based on historical work orders and historical material requirement corresponding to the historical work orders. The current material requirement may be determined based on the current work order and the comparison table of the material requirement through a relationship between the historical work orders and the historical material requirement corresponding to the historical work orders.

The work order urgency level refers to a relevant urgency level classification in repairing the gas device. For example, the work order urgency level may be represented by numbers, such as levels 1-9, where level 1 indicates lenient and level 9 indicates urgent. In some embodiments, a relationship between the work order and the work order urgency level may be preset, and the work order urgency level may be obtained according to the preset relationship.

The required work order completion time refers to a time period required to complete the work order, for example, complete the work order in one hour, in two hours. The required work order completion time may be determined in a plurality of ways. In some embodiments, a related table of different required work order completion times corresponding to different gas failure types and different gas failure repairing difficulties may be pre-recorded and saved. After obtaining the gas failure type and the gas failure repairing difficulty, the required work order completion time may be determined by checking the table, etc.

Step 220, determining at least one linked work order set based on the work order features, the linked work order set including at least one work order to be assigned.

The linked work order set refers to a combination of related work orders, which may include at least one work order to be assigned. In some embodiments, at least one linked work order set may be determined based on the work order features and on a preset rule. For example, the preset rule may be combining work orders whose gas failure locations are within a certain range.

In some embodiments, the work order to be assigned may be clustered based on the work order features, and the at least one linked work order set may be determined. For more information about using clustering to determine the linked work order set, please refer to FIG. 3 and its related descriptions.

Step 230, extracting a set feature of each linked work order set in the at least one linked work order set to be assigned.

The set feature of the linked work order set refers to attribute data of the linked work order set. For example, the set feature of the linked work order set may include a set gas failure repairing difficulty, a set gas failure type distribution, or the like. The set gas failure repairing difficulty may be determined by averaging the gas failure repairing difficulty of each work order in the linked work order set. The set gas failure type distribution refers to a count and proportion of different gas failure types in the linked work order set.

Step 240, determining an assignment scheme of the linked work order set and planning a linkage processing scheme based on the set feature.

The assignment scheme refers to a corresponding relationship between the linked work order set and processing personnel. The assignment scheme may determine experience conditions that need to be met to process the linked work order set by checking a table based on the set feature; retrieve processing personnel who meet the experience conditions, and filter and determine processing personnel based on a matching degree between a free time of the processing personnel who meet the experience conditions and a required completion time.

The linkage processing scheme refers to a specific implementation scheme for the pending work order set corresponding to the processing personnel. The linkage processing scheme may include a processing sequence, a traffic route, etc. In some embodiments, the processing sequence may be related to the work order urgency level, that is, the work order with a higher urgency level may be processed in a more prioritized sequence.

In some embodiments, the smart gas management platform may determine the assignment scheme of the linked work order set based on the set feature and plan a linkage processing scheme. For example, the smart gas management platform may determine the processing personnel corresponding to the linked work order set based on the set feature (such as the set gas failure repairing difficulty, the set gas failure types distribution), and instruct the processing personnel to complete the work order according to the sequence of the linked work order set.

In some embodiments, the smart gas management platform may determine at least one assignment scheme including at least one of the processing personnel and the pending work order corresponding to the processing personnel based on the set feature, and thus plan the linkage processing scheme including at least one of the processing sequence and the traffic route. For more content about planning the linkage processing scheme based on the processing personnel, please refer to FIG. 4 and its related descriptions.

In some embodiments, an optimal linkage processing scheme may be determined based on at least one candidate scheme. For more content about determining a dynamic planning of the optimal linkage processing scheme, please refer to FIG. 5 and its related descriptions.

In some embodiments, by packaging and processing related work orders to determine the linked processing scheme, it is more convenient in terms of carrying materials, transportation, etc. In addition, the linkage processing scheme takes into account completion times of all linked work orders and the impact on gas supply during work order processing, which can minimize the impact of work order processing on daily gas usage of users.

Figure 3:
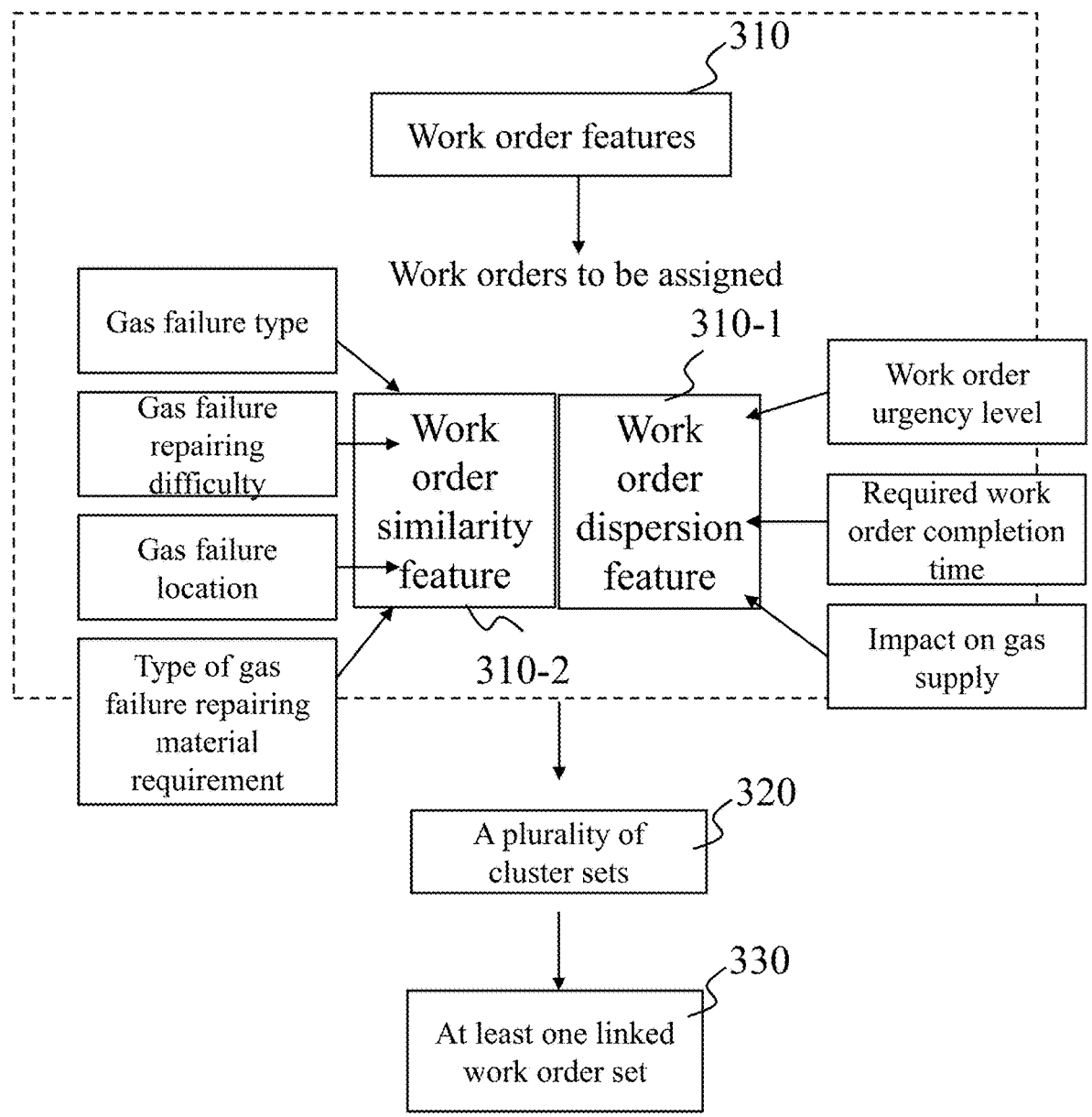
FIG. 3 is a schematic diagram illustrating an exemplary process for determining a linked work order set according to some embodiments of the present disclosure.

FIG. 3 is a schematic diagram illustrating an exemplary process for determining a linked work order set according to some embodiments of the present disclosure. As shown in FIG. 3, a schematic diagram 300 includes the following. In some embodiments, the schematic diagram 300 may be executed by the smart gas management platform.

In some embodiments, the smart gas management platform may cluster work orders to be assigned based on work order features 310 and determine at least one linked work order set 330. For more content about the work order features, the work orders to be assigned, and the linked work order set, please refer to FIG. 2 and its descriptions.

Clustering refers to a process of aggregating the work orders to be assigned into a plurality of categories.

In some embodiments, the clustering may be performed based on locations of the work orders to be assigned. For example, at least one work order to be assigned in a preset area may be taken as a cluster set, wherein the preset area may be divided based on a plurality of ways, for example, based on an actual administrative region, an actual requirement, or the like.

In some embodiments, the clustering may be performed according to a similarity between the work orders to be assigned. For more content about the clustering, please refer to the following.

In some embodiments, the smart gas management platform may determine a work order dispersion feature 310-1 and a work order similarity feature 310-2 of the work orders to be assigned based on the work order features 310; determine a plurality of cluster sets 320 based on a clustering distance between the work order features, and determine the at least one linked work order set 330 based on the cluster sets.

The work order similarity feature refers to a relevant feature that may be used to determine a degree of similarity between the work orders. For example, the work order similarity feature may include at least one of the gas failure type, the gas failure repairing difficulty, the gas failure location, or the type of the gas failure repairing material requirement. For example, the work order similarity feature may be vectorized as p (x, y, m, n), wherein x may represent the gas failure type, y may represent the gas failure repairing difficulty, m may represent the gas failure location, and n may represent the gas failure repairing material requirement.

The gas failure type refers to a type of a gas failure that occurs. For example, the gas failure type may be a potential failure, safety failure, operational failure, non-operational failure, etc. The potential failure refers to a related failure which may lead to a gas failure. For example, the potential failure may be gas pipeline bends and abnormal gas pipeline vibrations. The safety failure refers to a related failure that affect user safety. For example, the safety failure may be gas leaks and corrosion of gas pipelines. The operational failure refers to a failure that affects a normal operation of gas, etc. For example, the operational failure may be a regional pipeline outage, a regional regulator failure, etc. The non-operational failure refers to a related failure that is not related to gas operation. For example, the non-operational failure may be a dead battery, etc.

In some embodiments, the gas failure type may be judged manually. For example, after manually judging the gas failure type, the gas failure type may be sent to the smart gas management platform through the smart gas object platform or the smart gas user platform. In some embodiments, data related to gas operation may be obtained through the smart gas object platform, and the gas failure type may be determined after processing the data related to the gas operation based on the smart gas management platform.

The gas failure repairing difficulty refers to a complexity of repairing a gas failure. For example, the gas failure repairing difficulty may be represented by words, numbers, and percentages, for example, the words may be "simple", "general", "difficult", etc.

In some embodiments, the gas failure repairing difficulty may be judged manually. For example, after manually judging the gas failure repairing difficulty, the gas failure repairing difficulty may be sent to the smart gas management platform through the smart gas object platform or the smart gas user platform. In some embodiments, data related to gas operation may be obtained through the smart gas object platform, and the gas failure repairing difficulty may be determined after processing the data related to the gas operation based on the smart gas management platform.

The gas failure location refers to a specific location where the gas failure occurs. For example, the gas failure location may be represented by coordinates or a specific address, such as "Room 0001, Building A of a certain community", etc.

In some embodiments, the gas failure location may be obtained through the smart gas user platform. For example, a user may send the gas failure location through the smart gas user platform, and the smart gas management platform may obtain the gas failure location from the smart gas user platform.

The type of the gas failure repairing material requirement refers to a type of materials required for repairing a gas failure. For example, the type of the gas failure repairing material requirement may be a filter screen, a pipeline, a fan, etc.

In some embodiments, the smart gas management platform may determine the type of the gas failure repairing material requirement in a plurality of ways. For example, a comparison table of the type of the material requirement may be preset and the type of the material requirement may be determined by checking the table according to different types of material requirement corresponding to different types of gas failures. The comparison table of the type of the material requirement may include different types of gas failures and corresponding different types of material requirement.

The work order dispersion feature refers to a relevant feature that may be used to determine a degree of differentiation between work orders. For example, the work order dispersion feature may include at least one of a work order urgency level feature, a required work order completion time feature, or a feature of an impact on gas supply. For example, the work order dispersion feature may be vectorized as q (a, b, c), wherein a may represent the work order urgency level, b may represent the required work order completion time, and c may represent the impact on gas supply.

The work order urgency level refers to a degree of importance of the work order. For example, the work order urgency level may be represented by words, numbers, and percentages, for example, the percentage may be "0~100%".

In some embodiments, the work order urgency level may be related to a gas leak risk. In some embodiments, the work order urgency level may be judged based on gas leak risk through the smart gas management platform.

The gas leak risk refers to a risk of gas leaking out. For example, the gas leak risk may be represented by "high", "medium", "low". In some embodiments, the higher the gas leak risk, the higher the work order urgency level. For example, when the gas leak risk is "high", the work order urgency level may be "extremely urgent".

In some embodiments, the gas leak risk may be determined by the smart gas management platform based on an aging feature of a gas part, a risk feature of gas usage, and a location feature of a gas user.

The aging feature of the gas part refers to a relevant feature of degradation of the gas part. For example, the aging feature of the gas part may be an appearance of the gas part, a usage duration of the gas part, etc., such as an appearance and a usage duration of a gas stove, a gas hose, a gas meter, and other gas parts. In some embodiments, the aging feature of the gas part may be obtained through information uploaded by gas users. For example, the aging feature of the gas part may be obtained through text or photos uploaded by the gas users. In some embodiments, the aging feature of the gas part may be obtained by searching installation records. For example, the aging feature of the gas part may be obtained through installation content displayed in an installation record.

The risk feature of gas usage refers to a relevant feature of a risk during the usage of gas. For example, the risk feature of gas usage may include repeated ignition failures, peculiar smell, abnormal flames (e.g., different flame colors), abnormal gas meter consumption (e.g., a sudden increase in gas consumption) occur during the usage of gas. In some embodiments, the risk feature of the gas usage may be determined by submitting a work order content by the gas user. For example, the risk feature of the gas usage may be determined based on the failure content of the work order submitted by the gas user.

The location feature of the gas user refers to a specific location of the gas user. In some embodiments, the location feature of the gas user may be determined based on the content of the work order submitted by the gas user.

The required work order completion time refers to a completion time required by the work order, for example, 2 hours, 14:00, etc.

In some embodiments, the required work order completion time may be determined based on the content of the work order submitted by the gas user. In some embodiments, the required work order completion time may be automatically processed and determined based on the smart gas management platform through the gas platform work order linkage processing system.

The impact on gas supply refers to an impact related to the gas supply. In some embodiments, the impact on gas supply may be represented by a numerical value. The larger the numerical value, the greater the impact on gas not being supplied properly.

In some embodiments, the impact on gas supply may be determined by the smart gas management platform based on a weighted sum of a length of a gas supply stoppage and a range of affected users during a work order processing. The weighted sum may be determined based on experience or on actual requirement.

The length of the gas supply stoppage during the work order processing refers to a relevant time when the pipeline stops gas supply when the work order is being processed. The length of the gas supply stoppage during the work order processing may be determined based on the work order processing status. For example, if the pipeline stops the gas supply for 1 hour when the work order is being processed, the length of the gas supply stoppage during the work order processing is 1 hour.

The range of the affected users refers to a range of users affected by the gas supply. The range of the affected users may be determined in a plurality of ways. For example, the range of the affected users in a certain region may be determined based on a ratio of a count of households whose gas supply is stopped to a total count of households in the region. As another example, the range of the affected users in the certain region may be determined based on a ratio of an area where the gas supply is stopped of the region to a total area of the region.

In some embodiments, the impact on gas supply may be determined by an impact analysis model.

The Impact analysis model may be configured to predict impacts on gas supply. In some embodiments, the impact analysis model may be a graph neural network (GNN) model.

In some embodiments, an input of the impact analysis model may include work order features of work orders to be assigned and a regional pipeline network structure diagram, and an output may be the impact on gas supply.

For more content about the work order features of the work orders to be assigned, please refer to FIG. 2 and its related descriptions.

The regional pipeline network structure diagram refers to a relevant diagram that may reflect a pipeline network structure in a region. The pipeline network may be composed of pipelines and pipeline network devices, and the pipeline network devices may include a pressure regulating device, a cut-off valve, a sewage discharge part, etc. For example, an edge of the regional pipeline network structure diagram may be a pipeline network, and a node of the regional pipeline network structure diagram may be a gas source node of the pipeline network, a pressure regulating device node, a cut-off valve node, a sewage discharge part node, etc. In some embodiments, the regional pipeline network structure diagram may be determined based on the gas source node of the pipeline network and the location feature of the gas user. For example, when the feature location of the gas user is high population density, the regional pipeline network structure may be set to be dense.

Parameters affecting the analysis model may be obtained through training. In some embodiments, the impact analysis model may be obtained through a plurality of labeled training samples. For example, a plurality of labeled training samples may be input into an initial impact analysis model, a loss function may be constructed through labels and results of the initial impact analysis model, and the parameters affecting the analysis model may be updated iteratively based on the loss function. When the loss function of the initial impact analysis model meets preset conditions, the model training is completed, and a trained impact analysis model is obtained. The preset conditions may be the loss function converges, the count of iterations reaching a threshold, etc.

In some embodiments, the training samples may include work order features of sample work orders to be assigned, and a pipeline network structure diagram of a sample region. The label may be an actual impact on gas supply when the sample work order to be assigned is being processed. In some embodiments, the training sample may be obtained based on the work order feature of a historical work order to be assigned and the regional pipeline network structural diagram, and the label may be obtained through manual labeling.

In some embodiments of the present disclosure, by determining the impact on gas supply through the impact analysis model, work orders with a large range of gas supply impact may be separated to avoid an accumulation of such work orders, thereby reducing the impact on the normal usage of gas users.

In some embodiments, the smart gas management platform may determine a plurality of cluster sets based on a clustering distance between the work order feature and the at least one linked work order set based on the cluster sets.

The cluster sets refer to different sets formed by clustering different work orders. For example, the cluster set may be a set of similar types of gas failures, a set of similar gas failure repairing difficulties, a set of similar locations of gas failures, a set of similar types of materials for repairing gas failures, etc. As another example, the cluster set may be a set of work orders with similar urgency levels, a set of work orders with similar completion times, a set of similar impacts on gas supply, etc.

In some embodiments, the cluster set may be determined by a clustering distance between work order similarity features and work order dispersion features of work orders to be assigned. For example, work orders to be assigned with a clustering distance less than a threshold may be regarded as a cluster set.

In some embodiments, a clustering process may include:
S1: determining a count of cluster sets based on the work order dispersion feature, and determining a same count of initial cluster center points according to the count of the cluster sets, each initial cluster center point corresponding to an initial cluster set, and a distance between the work order dispersion feature corresponding to the initial cluster center points is greater than a threshold.
S2: assigning the each work order to be assigned to an initial cluster set corresponding to an initial cluster center point with a smallest clustering distance of the work order similarity feature, based on a clustering distance between a work order similarity feature of each work order to be assigned and a work order similarity feature corresponding to the each initial cluster center point;
S3: calculating an average value of the work order similarity feature of the work order to be assigned in the each initial cluster set, and identifying the average value as a new cluster center point;
S4: recalculating the clustering distance between the work order similarity feature of the work order to be assigned and a new cluster center point, and assigning the each work order to be assigned to the cluster center point with the smallest clustering distance of the work order similarity feature to form a new cluster set; and
S5: repeating S3 and S4 until all work orders to be assigned are no longer reassigned, or a count of iterations reaches a maximum value.

In some embodiments, the count of the cluster sets may be determined in a plurality of ways. For example, the count of the cluster sets may be manually preset or be determined based on a difference value of work order dispersion features, etc.

The difference value of work order dispersion features refers to a variance value between different work order dispersion features. For example, the difference value may be represented in terms of variance. For example, work order dispersion feature 1 may be represented by vector q1 (x1, y1, m1), work order dispersion feature 2 may be represented by vector q2 (x2, y2, m2) . . . , and work order dispersion feature n may be represented by vector qn (xn, yn, mn). The difference value of the work order dispersion features may be the variance between the vector q1 and the vector qn.

In some embodiments, a preset count of the cluster sets may be adjusted according to the variance determined by the work order dispersion feature to determine a final count of the cluster sets.

In some embodiments of the present disclosure, the count of cluster set may be determined based on the difference value of work order dispersion feature. As the variance based on the work order dispersion feature becomes smaller, the more concentrated the urgency and the required work order completion time, and a larger number of cluster sets are needed to assign such work order to ensure that all work orders to be assigned may be processed in a timely manner.

In some embodiments, the count of the cluster sets may be related to a completion time of the linkage processing scheme, and when the completion time exceeds a time threshold, the count of the cluster sets increases.

The completion time of the linkage processing scheme refers to a time required to complete the linkage processing scheme. For example, the completion time of the linkage processing scheme may be 8 hours.

In some embodiments, the completion time of the linkage processing scheme may be determined by the smart gas management platform based on the processing of the linkage processing scheme.

The time threshold refers to a time range value for completing gas repairing. For example, the time threshold may be 6 hours. In some embodiments, the time threshold may be preset according to actual situations.

In some embodiments of the present disclosure, when the completion time of the linkage processing scheme is obtained by dynamic planning exceeds the time threshold, it indicates a high volume (or time-consuming) of work orders in the cluster set. Given the high completion timeout for the linkage processing scheme, the count of cluster set needs to be increased to reduce the count of work orders to be assigned in each cluster set so as to reduce the timeout.

The clustering distance may represent a degree of similarity between the work order features of the work orders to be assigned and the work order feature corresponding to the cluster center point. In some embodiments, the clustering distance may be determined based on fusion of a first distance and a second distance.

The first distance may represent a degree of similarity between a work order similarity feature of a pending work order and the work order similarity feature of the cluster center point. In some embodiments, the first distance may be determined based on a distance between a work order similarity feature vector of the pending work order and a work order similarity feature vector of the cluster center point. The work order similarity feature vector may be recorded as $(s_{1\text{-}1}, s_{1\text{-}2}, s_{1\text{-}3}, s_{1\text{-}4})$, and each element in the vector successively represents the gas failure type, the gas failure repairing difficulty, the gas failure location, and the type of the gas failure repairing material requirement.

The second distance may represent a degree of similarity between a work order dispersion feature of the pending work order and a work order dispersion feature of the cluster center point. In some embodiments, the second distance may be determined based on a distance between a work order dispersion feature vector of the pending work order and a work order dispersion feature vector of the cluster center point. The work order dispersion feature vector may be recorded as $(s_{2\text{-}1}, s_{2\text{-}2}, s_{2\text{-}3})$, and each element in the vector successively represents the work order urgency level, the required work order required completion time, and the impact on gas supply.

In some embodiments, clustering distance may be positively correlated with the first distance and negatively correlated with the second distance.

In some embodiments, the clustering distance may be represented by equation. For example, the clustering distance may be represented as $S=\alpha S1-\beta S2$. S1 denotes the first distance, S2 denotes the second distance, and both $\alpha$ and $\beta$ denote coefficients greater than 0.

In some embodiments, for each cluster set in a plurality of cluster sets, a sum of material requirement of work orders to be assigned in the each cluster set not exceed a total count of materials capable of being carried.

The material requirement refers to a required material quantity of all work orders to be assigned in each cluster set. For example, if all work orders to be assigned in cluster set A require 20 filters, 30 meters of pipelines, and 10 fans, then the material requirement of cluster set A are 20 filters, 30 meters of pipelines, and 10 fans.

The total count of materials capable of being carried refers to a total count of materials that may only be carried according to actual situations. For example, according to management requirement or the actual situation of repair personnel, the total count of materials capable of being carried t may be 10 filters, 10 meters of pipelines, 5 fans.

In some embodiments, the smart gas management platform 130 may determine whether the total count of the material requirement of the work orders to be assigned in a cluster set exceeds the total count of materials capable of being carried. For example, when clustering, after assigning the work orders to be assigned to a cluster set with a closest clustering distance, whether the total count of material requirement corresponding to the work orders to be assigned in the cluster set exceeds the total count of materials capable of being carried may be judged. If not exceeds, the work order to be assigned may be assigned to a cluster set with a closest clustering distance; and if exceeds, the work order to be assigned may be assigned to a cluster set with a second closest clustering distance, and whether the total count of material requirement in the cluster set exceeds the total count of materials capable of being carried may be judged again, until the total count of material requirement does not exceed the total count of materials capable of being carried.

In some embodiments of the present disclosure, by setting the total count of material requirement of work orders to be assigned in the cluster set to not exceed the total count of materials capable of being carried, it may ensure that the total count of materials capable of being carried can meet material requirement of the work order to be assigned, meet requirement of all linked work orders in the cluster set, so as to avoid efficiency reduction by returning several times for materials.

In some embodiments of the present disclosure, by assigning work orders with similar features such as type, difficulty, location, and repair materials to the same set, unified processing can be facilitated; and dispersing features such as urgency, completion time, and impact on gas supply to different sets, work orders which are not being processed in time to affect the normal usage of gas users can be avoided.

Figure 4:
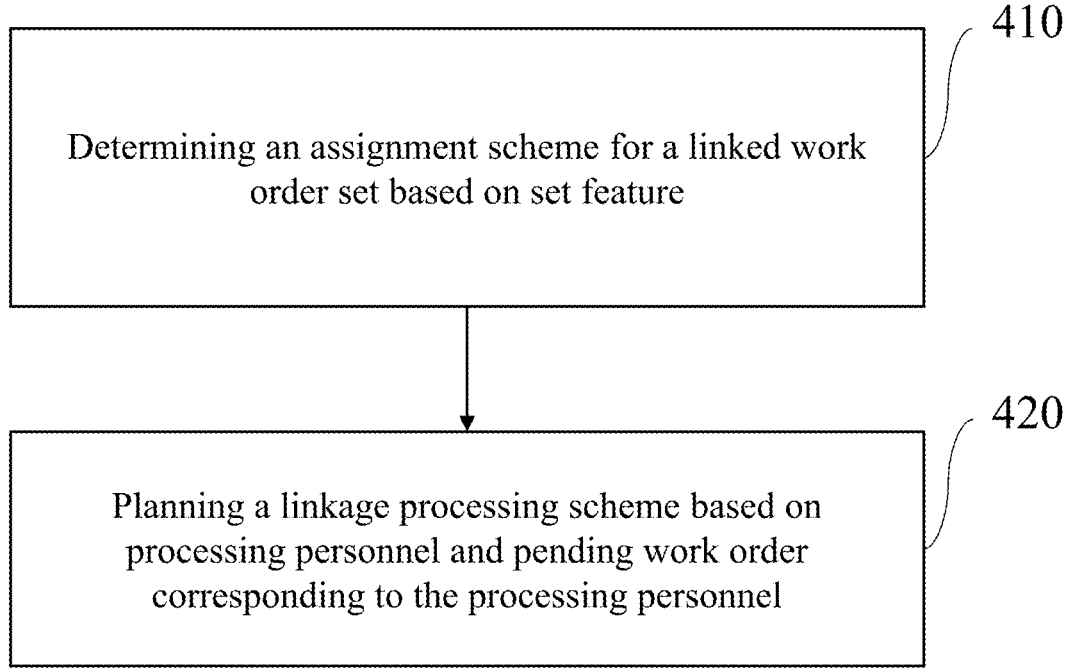
FIG. 4 is a flowchart illustrating an exemplary process for planning a linkage processing scheme according to some embodiments of the present disclosure.

FIG. 4 is a flowchart illustrating an exemplary process for planning a linkage processing scheme according to some embodiments of the present disclosure. As shown in FIG. 4, process 400 may include the following. In some embodiments, the process 400 may be executed by the smart gas management platform.

Step 410, determining an assignment scheme for a linked work order set based on a set feature.

In some embodiments, the set feature may include at least one of the set gas failure repairing difficulty or the set gas failure type distribution.

For more content about the set feature, please refer to FIG. 2 and its related descriptions.

The set gas failure repairing difficulty refers to an overall failure repairing difficulty of a work order set. In some embodiments, the set gas failure repairing difficulty may be determined by averaging the gas failure repairing difficulty of each work order in the linked work order set. For more content about the gas failure repairing difficulty, please refer to FIG. 3 and its related descriptions.

The set gas failure type distribution refers to an overall type distribution feature of the work order set. In some embodiments, the set gas failure type distribution may be determined based on the quantity and proportion of different gas failure types in the linked work order set. For more content about the set gas failure type distribution, please refer to FIG. 3 and its related descriptions.

In some embodiments, the assignment scheme may include at least one of processing personnel or the pending work order corresponding to the processing personnel.

In some embodiments, the smart gas management platform may determine the processing personnel by checking a table based on the set feature of a linked work order set. For example, the smart gas management platform may determine experience conditions that need to be met to process the linked work order set by checking a table; retrieve processing personnel who meet the experience conditions and filter processing personnel based on a matching degree between a free time of the processing personnel who meet the experience conditions and a required completion time, and determine final processing personnel.

In some embodiments, the proficiency of the processing personnel may need to meet a preset proficiency requirement.

The proficiency of the processing personnel refers to the proficiency of the processing personnel in handling the gas failure. The proficiency of the processing personnel may be represented by a "1-10" level.

In some embodiments, the proficiency of the processing personnel may be determined based on a processing personnel level and associated experience value. For example, the proficiency of the processing personnel with a high level and a high associated experience value may be higher.

The preset proficiency requirement refers to the proficiency meeting a threshold. For example, if the threshold is set to level 8, then the preset proficiency requirement may be that the proficiency is above level 8.

The processing personnel level refers to a relevant level indicating the ability of the processing personnel. The processing personnel level may be a position level of the processing personnel (e.g., chief engineer, technician), or a skill level of the processing personnel (e.g., senior engineer, junior engineer).

In some embodiments, the processing personnel level may be sent to the smart gas management platform through the smart gas service platform based on registration information of the processing personnel.

The associated experience value refers to an experience value of the processing personnel for processing relevant repair tasks. For example, the associated experience value may be represented by "0-100".

In some embodiments, the associated experience value may be related to the historical work order processing situation of the processing personnel.

The historical work order processing situation refers to a situation related to processing historical work orders. The historical work order processing situation may include a count of similar work orders with similar difficulty that have been processed.

In some embodiments, the historical word order processing situation may be obtained through a storage device based on the smart gas management platform.

In some embodiments, the associated experience value may be determined based on the historical work order processing situation of the processing personnel. For example, the associated experience value may be determined based on the count of similar historical work orders with similar difficulty processed by the processing personnel. If the count of the similar historical work orders with the similar difficulty processed by the processing personnel is larger, the associated experience value is higher.

The pending work order refers to a work order in the linked work order set after assignment. In some embodiments, the pending work order may be obtained based on the linked work order set determined by the work order features of the work orders to be assigned.

In some embodiments of the present disclosure, as processing personnel of the same level may specialize in different types, the proficiency of processing personnel on a type of work order may be judged by the count of similar types of work orders that have been processed by them, so as to ensure the assigned processing personnel more closely match the linked work order set.

Step 420, planning a linkage processing scheme based on processing personnel and pending work order corresponding to the processing personnel.

In some embodiments, the linkage processing scheme may include at least one of a processing sequence or a traffic route. For more content about the linkage processing scheme, please refer to FIG. 2 and its related descriptions.

The processing sequence refers to an order in which pending work orders in a linked work order set are processed. For example, the pending work orders may be pending work order 1, pending work order 2, and pending work order 3, and the processing sequence may be 3-2-1.

In some embodiments, the processing sequence may be determined based on the work order urgency level. For example, a work order with a high urgency level may be processed in a higher sequence.

The traffic route refers to a traffic route for processing pending work orders in a linked work order set. For example, locations of the pending work orders may be restaurant A, restaurant B, and restaurant C, wherein the restaurant A and the restaurant C are relatively close, so the traffic route may be A-C-B. In some embodiments, the traffic route may be determined based on the gas failure location.

In some embodiments of the present disclosure, the assignment scheme of the linked work order set is determined based on the set feature; the linkage processing scheme is planned through the processing personnel and the pending work order corresponding to the processing personnel, which can make the linkage processing scheme more effective and improve the efficiency of work order processing.

Figure 5:
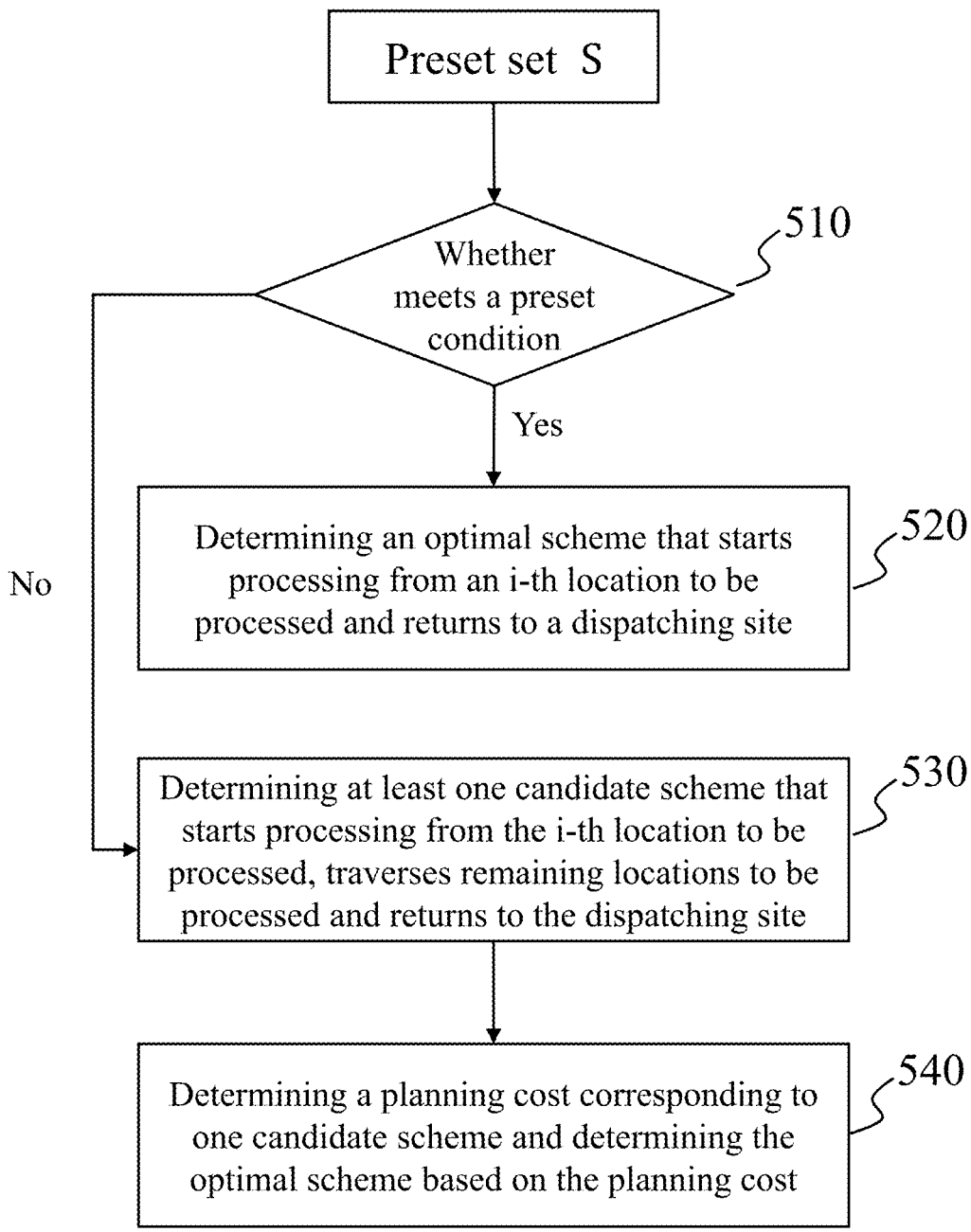
FIG. 5 is a schematic diagram illustrating an exemplary process for determining the linkage processing scheme according to some embodiments of the present disclosure.

FIG. 5 is a schematic diagram illustrating an exemplary process for determining a linkage processing scheme according to some embodiments of the present disclosure. As shown in FIG. 5, process 500 for determining the linkage processing scheme may include the following. In some embodiments, the process 500 may be executed by the smart gas management platform.

In some embodiments, the smart gas management platform may plan the linkage processing scheme based on processing personnel and a pending work order corresponding to the processing personnel.

In some embodiments, the smart gas management platform may determine an optimal scheme that starts processing from an i-th location to be processed corresponding an i-th pending work order and returns to a dispatching site as the linkage processing scheme. Specifically, following steps may be included:

Step 510, judging whether a preset set meets a preset condition.

The preset set may be a set of next location to be processed capable of being traveled to from the i-th location to be processed in the linked work order set, and the next location to be processed refers to any location to be processed in the linked work order set that has not yet been traversed.

In some embodiments, the preset set may be determined based on a current location of the processing personnel. For example, when the processing personnel is currently at a dispatching site $c_0$, the smart gas management platform may determine a preset set S ($\{c_1, c_2, \ldots, c_i\}$) based on the processing personnel and i pending work orders that need to be processed by him and i corresponding locations to be processed. $c_1$ indicates a first location to be processed corresponding to a first pending work order and $c_i$ indicates an i-th location to be processed corresponding to an i-th pending work order. As another example, if the processing personnel is currently at the first location to be processed $c_1$ corresponding to the first pending work order, and the processing personnel has not been to other locations to be processed, the smart gas management platform may determine a preset set S ($\{c_2, \ldots, c_i\}$) based on the processing personnel and i-1 pending work orders that need to be processed by him and corresponding i-1 locations to be processed.

In some embodiments, the preset conditions may include that a preset set is an empty set.

When the preset set meets the preset conditions, that is, there is no next location to be processed to travel to from a particular location to be processed, the smart gas management platform may determine the processing scheme which starts processing from the location to be processed and returns to the dispatching site as the optimal scheme.

Step 520, in response to the preset set meeting the preset condition, the smart gas management platform may determine a scheme that starts processing from an i-th location to be processed and returns to the dispatching site as the optimal scheme.

When the preset set S is an empty set, it means that there is no next location to be processed to travel to from the i-th location to be processed. At this time, returning to the dispatching site is an only scheme, and the smart gas management platform may determine the scheme as the optimal scheme.

Step 530, in response to the preset set not meeting the preset condition, the smart gas management platform may determine at least one candidate scheme that starts processing from the i-th location to be processed, traverses remaining locations to be processed, and returns to the dispatching site.

In some embodiments, determining at least one candidate scheme that starts processing from the i-th location to be processed, traversing remaining locations to be processed, and returning to the dispatching site may be implemented based on equation 1:

$$P(c_i, S) = \begin{cases} D(c_i, c_0), & \text{if } S = \emptyset \\ \min_{c_j \in S}\{D(c_i, c_j) + P(c_j, S - c_j)\} & \text{if } S \neq \emptyset \end{cases} \quad (1)$$

where $c_i$ denotes the i-th location to be processed, $c_0$ denotes the dispatching site, $c_j$ denotes the j-th location to be processed in the preset set S, $P(c_i, S)$ denotes a planning cost corresponding to a route with a lowest planning cost which goes back to the dispatching site after traversing locations to be processed from $c_i$ in the set S, $D(c_i, c_0)$ denotes a planning cost from $c_i$ location to be processed back to the dispatching site, $D(c_i, c_j)$ denotes a planning cost from $c_i$ location to be processed to $c_j$ location to be processed, $P(c_j, S-c_j)$ denotes a planning cost corresponding to a route with a lowest planning cost which goes back to the dispatching site after traversing all $S-c_j$ locations to be processed from $c_j$.

When the preset set S is an empty set which there is no next location to be processed capable of being traveled to from the i-th location to be processed, the processing personnel may return to dispatching site $c_0$. Currently, a route with a lowest planning cost which traverses all locations to be processed from $c_i$ and returns to the dispatching site is the route which starts processing from $c_i$ to the dispatching site $c_0$ with the planning cost $D(c_i, c_0)$.

When the preset set S is not an empty set, it is assumed that the processing personnel starts from the dispatching site $c_0$ and the preset set constituted by locations in need of traveling is S ($\{c_1, c_2, c_3\}$), then the problem to be solved may be represented as $P(c_0, S)$, which is expanded according to Equation 1 to be solved as follows.

$$\begin{aligned} P(c_0, S) &= \min_{c_j \in S}\{D(c_0, c_j) + P(c_j, S - c_j)\} \\ &= \min\{D(c_0, c_1) + P(c_1, S - c_1), D(c_0, c_2) + P(c_2, S - c_2), \\ & \quad D(c_0, c_3) + P(c_3, S - c_3)\} \end{aligned}$$

$D(c_0, c_1)+P(c_1, S-c_1)$, $D(c_0, c_1)+P(c_1, S-c_1)$ and $D(c_0, c_1)+P(c_1, S-c_1)$ may respectively denote a planning cost corresponding to a candidate scheme which starts from $c_0$ to the next location to be processed, $P(c_1, S-c_1)$, $P(c_2, S-c_2)$, $P(c_3, S-c_3)$ can be further split according to equation 1, and so on, until finally all values may be obtained directly.

Step 540, determining a planning cost corresponding to the at least one candidate scheme and determining the optimal scheme based on the planning cost.

In some embodiments, the smart gas management platform may calculate a planning cost of a candidate scheme, and then determine the candidate scheme with the lowest planning cost as the optimal scheme.

In some embodiments, the smart gas management platform may determine a planning cost corresponding to each candidate scheme in the at least one candidate scheme based on at least one of a traffic time of traversing route, a work order urgency level, or a work order completion time corresponding to the each candidate scheme, and determine the optimal scheme based on the planning cost.

In some embodiments, the planning cost of the candidate scheme is positively correlated with the traffic time of traversing route and the work order completion time corresponding to each candidate scheme, and negatively correlated with the work order urgency level.

The traffic time refers to a time spent moving from the dispatching site, traversing all locations to be processed in the candidate scheme, and returning to the dispatching site. In some embodiments, the traffic time may be obtained by the smart gas management platform in a plurality of ways. For example, the traffic time may be obtained based on historical processing data, or current traffic situation prediction, etc.

The completion time of the work order refers to a time required to process all pending work orders. In some embodiments, the work order completion time may be obtained by the smart gas management platform based on historical processing data. For example, the time used to complete a same type of a work order in the historical processing data is taken as the work order completion time.

The work order urgency level may represent the priority of work order processing. The higher the urgency level, the higher the corresponding processing priority. In some embodiments, the work order urgency level may be determined by the smart gas management platform based on the gas leak risk and the impact on gas supply. For more content about the gas leak risk and the impact on gas supply, please refer to FIG. 3 and its related descriptions.

In some embodiments, the planning cost is also related to the impact on gas usage. Specifically, the planning cost is positively correlated with the impact on gas usage.

The impact on gas usage usually refers to an impact on gas usage during the work order processing. In some embodiments, the impact on gas usage may be represented by a numerical value, wherein the larger the numerical value, the greater the impact on gas usage during the work order processing.

In some embodiments, the impact on gas usage may be determined based on an overlapping duration of an estimated processing time of each pending work order and a peak time of gas usage, and the impact on gas supply. The impact on gas supply may be determined through an impact analysis model. For more content about the impact analysis model, please refer to FIG. 3 and its related descriptions.

In some embodiments, the estimated processing time of the each pending work order may be determined based on the completion time and traffic time of all work orders processed before the work order. For example, it is assumed that an estimated processing time of pending work order A needs to be determined. If the pending work order A starts to be processed at 8:00, the completion time and traffic time in a total of work orders before the pending work order A is 2 hours, then the estimated start time for the pending work order A is at 10:00, then combined with a work hour requirement (for example, 40 minutes) of the work order, the estimated processing time of the pending work order A is obtained as 10:00-10:40.

In some embodiments, the impact on gas usage may be determined by the smart gas management platform based on equation 2:

$$N = \sum_{1}^{n}(k_{i1}w_{i1} + k_{i2}W_{i2}). \quad (2)$$

N denotes the impact on gas usage, n denotes a count of pending work orders, $w_{i1}$ denotes an overlapping duration of an estimated processing time of the i-th pending work order and a peak time of gas usage, $w_{i2}$ denotes the impact on gas supply of the i-th pending work order, $k_{i1}$ and $k_{i2}$ denote weights. $k_{i1}$ and $k_{i2}$ may be set according to historical experience and an actual requirement.

In some embodiments, the impact on gas usage may be related to an amount of completion time timeouts. The greater the amount of completion time timeouts, the greater the impact on gas usage.

The completion time overruns may be determined by the smart gas management platform based on equation 3:

$$\Delta T = \sum_{1}^{n} \gamma_i (T_{pi1} - T_{pi2}). \quad (3)$$

$\Delta T$ denotes the amount of completion time timeouts, $T_{pi1}$ denotes the estimated completion time of the i-th pending work order, $T_{pi2}$ denotes the required completion time of the i-th pending work order, n denotes the count of pending work order, and $\gamma_i$ denotes the corresponding weight of the i-th pending work order, the weight of the i-th pending work order is related to the urgency level of the i-th pending work order, the higher the work order urgency level, the greater the weight.

By determining the weight of the completion time overruns of each pending work order based on the work order urgency level, the impact of the work order urgency level is fully considered, which facilitates a more accurate determination of the impact on gas supply and thus a better determination of a planning cost.

In some embodiments of the present disclosure, the impact on gas usage is also considered when calculating a planning cost. When the affected range of gas usage is large, the planning cost may also increase accordingly, which is beneficial to eliminate schemes with greater impact on gas users, thereby reducing the impact on normal usage of gas.

In some embodiments, the planning cost may be determined by the smart gas management platform based on equation 4:

$$P = \alpha_1 T_1 + \alpha_2 T_2 - \alpha_3 M + \alpha_4 N + \beta. \quad (4)$$

P denotes the planning cost, $T_1$ denotes the traffic time, $T_2$ denotes the work order completion time, M denotes the work order urgency level, N denotes the impact on gas usage, $\alpha_1$ $\alpha_2$, $\alpha_3$, $\alpha_4$ all denote weights, and $\beta$ denotes an adjustment constant.

In some embodiments, $\alpha_1$, $\alpha_2$, $\alpha_3$, $\alpha_4$ may be set according to historical experience and an actual requirement.

In some embodiments, the smart gas management platform may determine the preferred scheme based on the planning cost. Specifically, the smart gas management platform may take the candidate scheme with the lowest planning cost as the optimal scheme, and then determine a linkage processing scheme based on the optimal scheme.

In some embodiments of the present disclosure, the traffic time, work order completion time, the work order urgency level, the impact on gas usage, and various factors are comprehensively considered, which is conducive to choosing a more reasonable linkage processing scheme and enabling work order processing to be smoother, thereby ensuring processing efficiency.

It should be noted that the above descriptions of the relevant schemes are only for illustration and description, and do not limit the scope of application of the present disclosure. For those skilled in the art, various modifications and changes may be made under the guidance of the present disclosure. However, these modifications and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for determining a smart gas work order set allocation plan, wherein the method is executed by an Internet of Things (IoT) system for determining a smart gas work order set allocation plan, wherein:
   the IoT system includes a smart gas user platform, a smart gas service platform, a smart gas management platform, a smart gas sensor network platform, and a smart gas object platform;
   the smart gas sensor network platform is configured as a communication network and a gateway, and the smart gas object platform is configured as a gas device; and
   the method comprises:
   obtaining relevant data of the gas device by the smart gas object platform, and uploading the relevant data to the smart gas management platform through the smart gas sensor network platform;
   by the smart gas management platform,
   extracting work order features of a work order to be assigned based on the relevant data of the gas device;
   determining a plurality of cluster sets based on a cluster distance between the work order features, the cluster distance being determined based on a fusion of a first distance and a second distance; wherein the first distance is determined based on a distance between a work order similarity feature vector of the work order to be assigned and a work order similarity feature vector of a cluster center point; the second distance is determined based on a distance between a work order dispersion feature vector of the work order to be assigned and a work order dispersion feature vector of the cluster center point; elements in the work order dispersion feature vector include a gas supply impact, the gas supply impact is determined based on the work order features and a regional pipeline network structure map by an impact analysis model, and the impact analysis model is a machine learning model; wherein
   determining a count of the cluster sets based on a difference value of a work order dispersion feature; and
   the count of cluster sets is also related to an amount of completion time timeout of a linkage processing scheme, and when a completion time exceeds a time threshold, the count of the cluster sets is increased according to a preset rule;
   determining at least one linked work order set based on the plurality of cluster sets, wherein for each cluster set in the plurality of cluster sets, a sum of material requirement of work orders to be assigned in the each cluster set does not exceed a total amount of materials capable of being carried;
   extracting set features of the linked work order set;
   determining an assignment scheme of the linked work order set based on the set features, the assignment scheme including at least one of a processing personnel and a pending work order corresponding to the processing personnel;
   in response to a preset set in the linked work order set meeting a preset condition, determining a scheme which starts processing from an i-th location to be processed and returns to a dispatching site as an optimal scheme, wherein the i-th location to be processed is a location corresponding to an i-th pending work order, and the preset set is a set of next locations to be processed capable of being traveled to starting from the i-th location to be processed in the linked work order set; and
   in response to the preset set not meeting the preset condition,
   determining at least one candidate scheme which starts processing from the i-th location to be processed, traverses remaining locations to be processed, and returns to the dispatching site;
   determining the amount of completion time timeout by performing a weighted sum based on a length of time that an estimated completion time of the pending work order exceeds a required completion time of the pending work order, wherein a weight of the weighted sum is related to a work order urgency level of the pending work order;
   determining an impact on gas usage based on an overlapping duration of an estimated processing time of each pending work order and a peak time of gas usage, the gas supply impact, and the amount of completion time timeout;
   determining a planning cost corresponding to each candidate scheme in the at least one candidate scheme based on at least one of a traffic time of traversing routes, a work order urgency level, a work order completion time corresponding to the each candidate scheme, or the impact on gas usage; and
   determining the optimal scheme based on the planning cost;
   determining the linkage processing scheme based on the optimal scheme, the linkage processing scheme including a processing sequence and a traffic route; and
   sending the assignment scheme and the linkage processing scheme to the smart gas service platform; and
   sending, by the smart gas service platform, the assignment scheme and the linkage processing scheme to a smart gas user according to an inquiry instruction sent by the smart gas user platform.

2. The method according to claim 1, further comprising:
   transmitting the assignment scheme and the linkage processing scheme to a smart gas data center; and
   transmitting the assignment scheme and the linkage processing scheme to the smart gas service platform by the smart gas data center.

3. The method according to claim 1, wherein the work order features include at least one of a work order similarity feature and the work order dispersion feature; and
   the method further comprises:
   determining the work order similarity feature based on a gas failure type, a gas failure repairing difficulty, a gas failure location, and a type of repairing material requirement;
   determining the work order dispersion feature based on the work order urgency level, a required work order completion time, and the gas supply impact;
   determining the work order dispersion feature vector based on the work order dispersion feature; and determining the work order similarity feature vector based on the work order similarity feature.

4. The method according to claim 1, wherein the set features include at least one of a set gas failure repairing difficulty or a set gas failure type distribution, and the set gas failure type distribution includes a quantity and a proportion of different gas failure types.

5. The method according to claim 1, further comprising:
determining proficiency of a candidate processing personnel based on a processing personnel level and an associated experience value; wherein the associated experience value is related to a historical work order processing situation of the candidate processing personnel; and
if the proficiency meets a preset proficiency requirement, determining the candidate processing personnel as the processing personnel.

6. The method according to claim 1, wherein the machine learning model includes a graph neural network (GNN) model, and the impact analysis model is obtained by training an initial impact analysis model; and
the method further comprises:
inputting labeled training samples into the initial impact analysis model, wherein the labeled training samples include work order features of sample work orders to be assigned and a pipeline network structure diagram of a sample region, a label of the labeled training samples is an actual impact on gas supply when the sample work order to be assigned is being processed, and an edge of the pipeline network structure diagram of the sample region is a pipeline network of the sample region, a node of the pipeline network structure diagram of the sample region is a gas source node of the pipeline network of the sample region, a pressure regulating device node, a cut-off valve node, and a sewage discharge part node;
constructing a loss function based on an output of the initial impact analysis model and the label;
iteratively updating parameters of the initial analysis model based on the loss function; and
in response to the loss function satisfying a training termination condition, terminating the training and obtaining a trained impact analysis model.

7. The method of claim 1, wherein the work order features includes at least one of a gas failure type, a gas failure repairing difficulty, a gas failure location, a gas failure repairing material requirement, the work order urgency level, or a required work order completion time, and the work order urgency level is related to a gas leak risk.

8. An Internet of Things (IoT) system for determining a smart gas work order set allocation plan, comprising a smart gas user platform, a smart gas service platform, a smart gas management platform, a smart gas sensor network platform, and a smart gas object platform; wherein
the smart gas sensor network platform is configured as a communication network and a gateway, and the smart gas object platform is configured as a gas device; and
the smart gas object platform is configured to obtain relevant data of the gas device, and upload the relevant data to the smart gas management platform through the smart gas sensor network platform;
the smart gas management platform is configured to:
extract work order features of a work order to be assigned based on the relevant data of the gas device;
determine a plurality of cluster sets based on a cluster distance between the work order features, the cluster distance being determined based on a fusion of a first distance and a second distance; wherein the first distance is determined based on a distance between a work order similarity feature vector of the work order to be assigned and a work order similarity feature vector of a cluster center point; the second distance is determined based on a distance between a work order dispersion feature vector of the work order to be assigned and a work order dispersion feature vector of the cluster center point; elements in the work order dispersion feature vector include a gas supply impact, the gas supply impact is determined based on the work order features and a regional pipeline network structure map by an impact analysis model, and the impact analysis model is a machine learning model; wherein
determining a count of the cluster sets based on a difference value of a work order dispersion feature; and
the count of cluster sets is also related to an amount of completion time timeout of a linkage processing scheme, and when a completion time exceeds a time threshold, the count of the cluster sets is increased according to a preset rule;
determine at least one linked work order set based on the plurality of cluster sets, wherein for each cluster set in the plurality of cluster sets, a sum of material requirement of work orders to be assigned in the each cluster set does not exceed a total amount of materials capable of being carried;
extract set features of the linked work order set;
determine an assignment scheme of the linked work order set based on the set features, the assignment scheme including at least one of a processing personnel and a pending work order corresponding to the processing personnel;
in response to a preset set in the linked work order set meeting a preset condition, determine a scheme which starts processing from an i-th location to be processed and returns to a dispatching site as an optimal scheme, wherein the i-th location to be processed is a location corresponding to an i-th pending work order, and the preset set is a set of next locations to be processed capable of being traveled to starting from the i-th location to be processed in the linked work order set; and
in response to the preset set not meeting the preset condition,
determine at least one candidate scheme which starts processing from the i-th location to be processed, traverses remaining locations to be processed, and returns to the dispatching site;
determining the amount of completion time timeout by performing a weighted sum based on a length of time that an estimated completion time of the pending work order exceeds a required completion time of the pending work order, wherein a weight of the weighted sum is related to a work order urgency level of the pending work order;
determining an impact on gas usage based on an overlapping duration of an estimated processing time of each pending work order and a peak time of gas usage, the gas supply impact, and the amount of completion time timeout;
determine a planning cost corresponding to each candidate scheme in the at least one candidate scheme based on at least one of a traffic time of traversing routes, a work order urgency level, a work order completion time corresponding to the each candidate scheme, or the impact on gas usage; and determine the optimal scheme based on the planning cost;
determine the linkage processing scheme based on the optimal scheme, the linkage processing scheme including a processing sequence and a traffic route; and
send the assignment scheme and the linkage processing scheme to the smart gas service platform; and
the smart gas service platform is configured to send the assignment scheme and the linkage processing scheme to a smart gas user according to an inquiry instruction sent by the smart gas user platform.

9. The IoT system according to claim 8, wherein the smart gas management platform is configured to:
transmit the assignment scheme and the linkage processing scheme to a smart gas data center; and
transmit the assignment scheme and the linkage processing scheme to the smart gas service platform by the smart gas data center.

10. The IoT system according to claim 8, wherein the work order features include at least one of a work order similarity feature and the work order dispersion feature; and
the smart gas management platform is configured to:
determine the work order similarity feature based on a gas failure type, a gas failure repairing difficulty, a gas failure location, and a type of repairing material requirement;
determine the work order dispersion feature based on the work order urgency level, a required work order completion time, and the gas supply impact;
determine the work order dispersion feature vector based on the work order dispersion feature; and
determine the work order similarity feature vector based on the work order similarity feature.

11. The IoT system according to claim 8, wherein the set features include at least one of a set gas failure repairing difficulty or a set gas failure type distribution, and the set gas failure type distribution includes a quantity and a proportion of different gas failure types.

12. The IoT system according to claim 8, wherein the smart gas management platform is configured to:
determine proficiency of a candidate processing personnel based on a processing personnel level and an associated experience value; wherein the associated experience value is related to a historical work order processing situation of the candidate processing personnel; and
if the proficiency meets a preset proficiency requirement, determine the candidate processing personnel as the processing personnel.

13. The IoT system according to claim 8, wherein the machine learning model includes a graph neural network (GNN) model, and the impact analysis model is obtained by training an initial impact analysis model; and
the smart gas management platform is configured to:
input labeled training samples into the initial impact analysis model, wherein the labeled training samples include work order features of sample work orders to be assigned, and a pipeline network structure diagram of a sample region, a label of the labeled training samples is an actual impact on gas supply when the sample work order to be assigned is being processed, and an edge of the pipeline network structure diagram of the sample region is a pipeline network of the sample region, a node of the pipeline network structure diagram of the sample region is a gas source node of the pipeline network of the sample region, a pressure regulating device node, a cut-off valve node, and a sewage discharge part node;
construct a loss function based on an output of the initial impact analysis model and the label;
iteratively update parameters of the initial analysis model based on the loss function; and
in response to the loss function satisfying a training termination condition, terminate the training and obtain a trained impact analysis model.

14. The method according to claim 7, further comprising:
determining the gas leak risk by the smart gas management platform based on an aging feature of a gas part, a risk feature of gas usage, and a location feature of a gas user.

* * * * *